US010929614B2

(12) United States Patent
Mei et al.

(10) Patent No.: US 10,929,614 B2
(45) Date of Patent: Feb. 23, 2021

(54) AUTOMATED CONTEXTUAL DIALOG GENERATION FOR COGNITIVE CONVERSATION

(71) Applicant: INTERNATIONAL BUSINESS MACHINES CORPORATION, Armonk, NY (US)

(72) Inventors: Li Jun Mei, Beijing (CN); Qi Cheng Li, Beijing (CN); Xin Zhou, Beijing (CN); Jie Ma, Nanjing (CN); Shao Chun Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 16/238,868

(22) Filed: Jan. 3, 2019

(65) Prior Publication Data
US 2020/0218780 A1 Jul. 9, 2020

(51) Int. Cl.
*G06F 17/27* (2006.01)
*G06F 40/30* (2020.01)
*G06N 3/08* (2006.01)

(52) U.S. Cl.
CPC ............ *G06F 40/30* (2020.01); *G06N 3/08* (2013.01)

(58) Field of Classification Search
CPC .. G06F 17/001; G06F 17/30; G06F 17/30864; G06F 17/3071; G06F 3/0484;
(Continued)

(56) References Cited

U.S. PATENT DOCUMENTS 5,619,709 A * 4/1997 Caid .................. G06F 16/58
715/209
8,265,252 B2 9/2012 Ducheneaut et al.
(Continued)

OTHER PUBLICATIONS

Mei, "Knowledge Learning for Cognitive Business Conversations", IEEE International Conference on Cognitive Computing, Jun. 2017, pp. 128-131.
(Continued)

*Primary Examiner* — Leshui Zhang
(74) *Attorney, Agent, or Firm* — Tutunjian & Bitetto, P.C.; Joseph Petrokaitis

(57) ABSTRACT

Systems and method for automated contextual dialog generation for cognitive conversations include embedding a natural language sentence input by a user into a corresponding sentence vector using a sentence embedder. A context array is generated using a contextual sentence embedder to embed the sentence vector and previous sentence vectors of a conversation history into a context array. Response words are predicted from the sentence vector by performing sequence-to-sequence dialog prediction with a dialog prediction network. Context of the input sentence is quantified by extracting context features from the context array using a situation quantification network. A response dialog is generated in natural language to display to a user, the response dialog responding to the input sentence with a response generator by determining a dialog state including the response words and the quantified context and optimizing the response dialog with reinforcement learning corresponding to the dialog state.

20 Claims, 10 Drawing Sheets

(58) Field of Classification Search
CPC ... G06F 7/00; G06F 3/00; G06F 40/20; G06F 40/205; G06F 40/216; G06F 40/226; G06F 40/237; G06F 40/274; G06F 40/279; G06F 40/284; G06F 40/289; G06F 40/295; G06F 40/30; G06F 40/35; G06F 17/30684; G06F 17/3069; G06F 17/30696; G06F 17/2785; G06Q 30/0202; G06N 7/005; G06N 5/02; G06N 5/04; G06N 3/126; G06N 3/08; G06N 3/02; G06N 3/04; G06N 3/445; G06N 3/463; G06N 3/082; G06N 3/084; G06N 3/086; G06N 3/088; G10L 2015/022; G10L 2015/025; G10L 2015/027; G10L 2015/063; G10L 2015/0631; G10L 2015/0633; G10L 2015/0635; G10L 2015/0638; G10L 2015/08; G10L 2015/081; G10L 2015/083; G10L 2015/085; G10L 2015/086; G10L 2015/088; G10L 15/14; G10L 15/142; G10L 15/144; G10L 15/16; G10L 15/18; G10L 15/1815; G10L 15/1822; G10L 15/183
USPC ......... 704/1–10; 707/1, 2, 3, 4, 5, 6, 7, 8, 9, 707/10, 100, 101, 102, 104, 200, 205, 707/E17.058, E17.061, E17.063, E17.065, 707/E17.066, E17.068, E17.069, E17.07, 707/E17.071, E17.072, E17.074, E17.075, 707/E17.077, E17.078, E17.079, E17.08, 707/E17.081, E17.082
See application file for complete search history.

(56) References Cited

U.S. PATENT DOCUMENTS

| | | |
|---|---|---|
| 9,697,198 B2 | 7/2017 | Davis Jones et al. |
| 2014/0278379 A1* | 9/2014 | Coccaro .............. G10L 15/1822 704/202 |
| 2018/0157637 A1 | 6/2018 | Grant et al. |
| 2018/0190144 A1 | 7/2018 | Corelli et al. |
| 2018/0204107 A1 | 7/2018 | Tucker |
| 2020/0097544 A1* | 3/2020 | Alexander .............. G06F 40/30 |

OTHER PUBLICATIONS

"Cognitive Conversation for Creating Conversations Between Apps and Users", https://www.ibm.com/cloud/garage/architectures/cognitiveConversationDomain; accessed Sep. 2018, 5 pages.

* cited by examiner

AUTOMATED CONTEXTUAL DIALOG GENERATION FOR COGNITIVE CONVERSATION

BACKGROUND

Technical Field

The present invention generally relates to automated dialog generation, and more particularly to automated contextual dialog generation for cognitive conversations.

Description of the Related Art

Various areas of commerce and society utilize interpersonal interaction to perform a task, such as, e.g., stock trading, resetting a password, package tracking, among other tasks that may benefit from the assistance of another person. However, it can often be desirable to have self-service options for performing the task because, e.g., another person is unavailable due to a large number of concurrent users, low assistant numbers, or preference towards self-service. Thus, automated systems for providing task-based interactions and responses with a user can be beneficial.

However, such automated systems can be inaccurate or lack context. Thus, people may be needed to resolve confusion or issues associated with interactions with the automated systems. Therefore, automated systems can fail to reduce costs of task-based interactions while also decreasing quality of service.

SUMMARY

In accordance with an embodiment of the present invention, a method for automated contextual dialog generation for cognitive conversations is presented. The method includes embedding a natural language sentence input by a user into a corresponding sentence vector using a sentence embedder. A context array is generated using a contextual sentence embedder to embed the sentence vector and at least one previous sentence vector into a context array in a memory, each of the at least one previous sentence vector corresponding to a previous sentence in a conversation history stored in a memory. Response words are predicted from the sentence vector by performing sequence-to-sequence dialog prediction with a dialog prediction network. Context of the input sentence is quantified by extracting context features from the context array using a situation quantification network. A response dialog is generated in natural language to display to a user, the response dialog responding to the input sentence with a response generator by determining a dialog state including the response words and the quantified context and optimizing the response dialog with reinforcement learning corresponding to the dialog state.

In accordance with another embodiment of the present invention, a method for automated contextual dialog generation for cognitive conversations is presented. The method includes embedding a natural language sentence input by a user into a corresponding sentence vector using a sentence embedder. A context array is generated using a contextual sentence embedder to embed the sentence vector and at least one previous sentence vector into a context array in a memory, each of the at least one previous sentence vector corresponding to a previous sentence in a conversation history stored in a memory. The sentence vector and the previous sentence vectors are clustered with a sentence cluster to produce sentence vector clusters. The sentence vector clusters are embedded into a context array with a context embedder. Response words are predicted from the sentence vector by performing sequence-to-sequence dialog prediction with a dialog prediction recurrent neural network. Context of the input sentence is quantified concurrently with the predicting the response words by extracting context features from the context array using a situation quantification network. A response dialog is generated in natural language to display to a user, the response dialog responding to the input sentence with a response generator by determining a dialog state including the response words and the quantified context and optimizing the response dialog with reinforcement learning corresponding to the dialog state.

In accordance with another embodiment of the present invention, a system for automated contextual dialog generation for cognitive conversations is presented. The system includes a storage device for storing a conversation history including at least one previous sentence of a conversation, and a processing system that responds to a user input using a processing device. The processing system includes a sentence embedder that embeds a natural language input sentence into a sentence vector. A context embedder embeds the input sentence and at least one previous sentence of a conversation history into a context array. A dialog prediction network predicts response words from the sentence vector by performing sequence-to-sequence dialog prediction with a dialog prediction network. A situation quantification network quantifies context of the input sentence by extracting context features from the context array. A response generator that generates a response dialog responding to the input sentence by determining a dialog state including the response words and the quantified context and optimize the response dialog with reinforcement learning corresponding to the dialog state.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
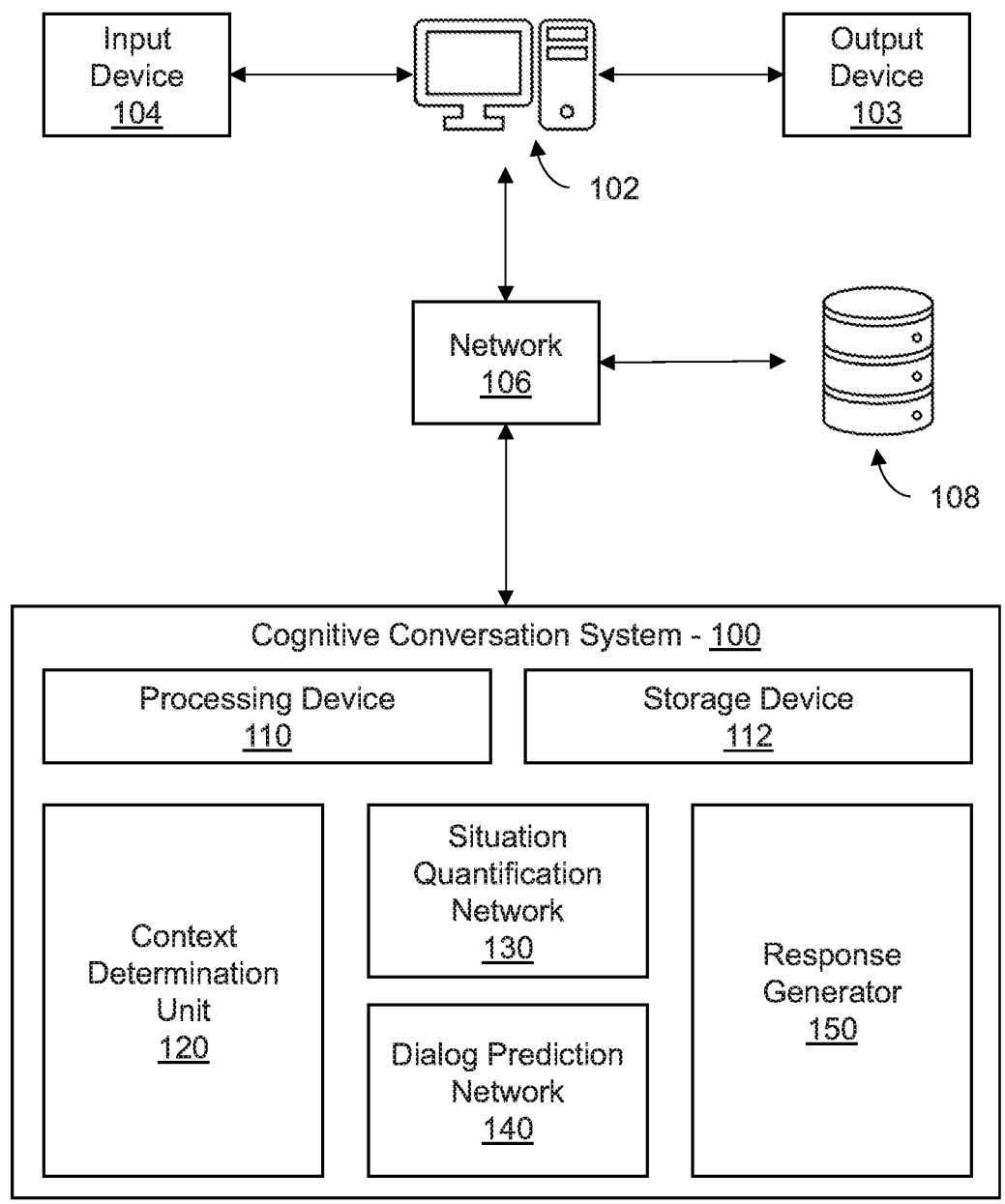
FIG. 1 is a diagram of a system for automated contextual dialog generation for cognitive conversations, in accordance with an embodiment of the present invention.

According to an embodiment of the present invention, an automated system for cognitive conversations is described. The system utilizes context from passed conversation entries to formulate a response to an input. As a result, the response can provide high-quality service and accurate information corresponding to the input.

For example, the system can maintain a history of a conversation. A user can input a sentence, such as, e.g., a question, a statement, a request, or other sentence. A context determination unit is used to put the sentence into context using the history of the conversation. The context determination unit can use a series of sentence clustering and sampling to transform the sentence into a contextual sentence that relates previous sentences to the input sentence. The contextual sentence can be produced as a context vector.

The context vector is analyzed by a situation quantification network to determine a quantified context of the sentence. The situation quantification network can be, e.g., a convolutional neural network (CNN) or other artificial neural network (ANN) for estimating a situation vector from a context vector. Concurrently, a dialog prediction network, such as, e.g., a recurrent neural network (RNN) or other ANN, uses a feature vector in which the input sentence is embedded to predict dialog content.

The predicted dialog content and the situation vector can be used in conjunction with a state estimator and action planner to produce a response. By using both the predicted dialog content and the situation vector, context can be taken into account when responding to an input sentence. Thus, the produced response is more accurate in light of the conversation, with greater ability to respond to input that relies on context. Thus, a cognitive conversation can be held by the system for more efficient and autonomous services for user assistance in a variety of tasks.

Exemplary applications/uses to which the present invention can be applied include, but are not limited to: conversational systems for database and network searches, information requests, password resets, shipment tracking, settings interaction, smart home control, financial services, among other voice or text based conversational interactions in computing systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to the drawings in which like numerals represent the same or similar elements and initially to FIG. 1, a diagram of a system for automated contextual dialog generation for cognitive conversations is depicted according to an illustrative embodiment of the present invention.

According to an embodiment of the present invention, a computing device 102 can communicate with a network 106 to perform a variety of tasks, such as, e.g., database 108 and network 106 searches, information requests, password resets, shipment tracking, settings interaction, smart home control, financial services, among other voice or text based conversational interactions in computing systems. As such, the database 108 can also be in communication with the network 106 to provide information associated with responses generated in response to a user sentence.

The user can input a sentence to the computing device 102 via an input device 104, such as, e.g., a keyboard, a mouse, a touch screen, a microphone, or other tactile, visual or audible input device. Thus, the user can interact with the computing system 102. One form of interaction can be a conversational interface whereby the user can request information, perform tasks, as well as any other interaction. Thus, the user can input a sentence into the computing system 102.

The computing system 102 can be in communication with a cognitive conversation system 100 to analyze and respond to the sentence. The cognitive conversation system 100 can communicate with the computing system 102, e.g., via the network 106. However, in other possible embodiments, the cognitive conversation system 100 can be, e.g., local to the computing system 102, in direct communication with the computing system 102 via a wired or wireless connection, or connected via another network different from the network 106, or any other type of connection.

The cognitive conversation system 100 can include a processing 110, such as, e.g., a central processing unit (CPU), graphical processing unit (GPU), resistive processing unit (RPU) or other processing unit, for performing operations associated with cognitive conversation tasks. For example, the processing device 110 can retrieve data stored in a storage device 112 and/or the database 108, such as, e.g., conversation histories, or other stored data relevant to cognitive conversation processing including data related to the tasks being performed.

The cognitive conversation system 100 also includes a context determination unit 120, a situation quantification network 130, a dialog prediction network 140 and a response generator 150. Each of the context determination unit 120, the situation quantification network 130, the dialog prediction network 140 and the response generator 150 are in communication with the processing device 110 and the storage device 112. As such, each of the context determination unit 120, the situation quantification network 130, the dialog prediction network 140 and the response generator 150 can include a memory device such as, e.g., random access memory (RAM), read only memory (ROM), or other memory devices to store an associated model. The processing device 110 can access the models to perform cognitive conversations. However, each component can also include a respective processing device, such as, e.g., a CPU, GPU or RPU.

The context determination unit 120, described above, can include a memory device with one or more models for representing context of the input sentence in a conversation history. The context determination unit 120 can also include, e.g., a processing device for performing the representation with the models. As such, the context determination unit 120 retrieves the input conversation from, e.g., the storage device 112, the database 108 or from the computing device 102 via the network 106. The context determination unit 120 also retrieves a conversation history from, e.g., the storage device 112, the database 108 or from the computing device 102 via the network 106, or, alternatively, can maintain a conversation log for directly storing the conversation history in the context determination unit 120.

Using the input sentence and the conversation history, the context determination unit determines feature vectors representing the input sentence and the conversation history such that the input sentence and the conversation history can be analyzed to generate a response. According to a possible embodiment, the context determination unit 120 can generate a feature vector including a sentence vector that represents the input sentence. The context determination unit 120 converts the input sentence into the sentence vector using sentence embedding.

The dialog prediction network 140 uses the sentence vector to predict a response using, e.g., an artificial neural network (ANN) such as, e.g., a recurrent neural network (RNN), including, e.g., long short-term memory (LSTM) units. The dialog prediction network 140 can be a software module stored in a memory and executed by a processor such as, e.g., the processing device 110, or a processing device local to the dialog prediction network 140. Alternatively, the dialog prediction network 140 can be a hardware network employing, e.g., resistive processing units (RPU), memristors, or other hardware neural networks. Thus, the dialog prediction network 140 retrieves the sentence vector from the context determination unit 120 and translates the sentence vector into a response vector using, e.g., sequence-to-sequence (seq2seq) translation according to trained weights or objectives of the dialog prediction network 140.

Additionally, according to a possible embodiment, the context determination unit 120 can also generate a feature vector including a context vector that represents the conversation history. The context determination unit 120 converts the conversation history into the context vector by, e.g., sentence clustering and sampling of the sentence vector, as well as past sentence vectors embedded from previous user inputs.

The situation quantification network 130 uses the context vector to determine a situation quantification using, e.g., an ANN such as, e.g., a convolutional neural network (CNN). The situation quantification network 130 can be a software module stored in a memory and executed by a processor such as, e.g., the processing device 110, or a processing device local to the situation quantification network 130. Alternatively, the situation quantification network 130 can be a hardware network employing, e.g., resistive processing units (RPU), memristors, or other hardware neural networks.

The situation quantification can include a vector that represents context, such as, e.g., relative relations between multiple consecutive dialogs in a conversation, such as, e.g., two consecutive dialogs. Thus, the situation quantification evaluates the relationship between the input sentence and a previous sentence to quantify context. The relationship can be determined according to learned weights or objectives, e.g., at each convolutional layer of a CNN. Thus, the situation quantification can be improved through training to better represent context.

The situation quantification and the response vector can be used to determine a dialog state. To do so, the response generator 150 can implement an optimization function, such as, e.g., a maximization function taking into account the situation quantification, conversation history, the predicted response and the input sentence. Using this optimization function, the response generator 150 can refine the response and determine an error to train both the situation quantification network 130 and the dialog prediction network 140.

The response can then be returned to the computing system 102 to notify a user via an output device 103. For example, the output device 103 can include, e.g., a display, speakers, a Braille panel, or other information output device. Thus, the computing system 102 can, e.g., play the response in spoken word through speakers to the user, or display text of the response to the user on a display. As a result, the user can interact with computer system 102 in a conversational manner, inputting requests into the computer system 102 and receiving in return appropriate and accurate responses given the context of the requests. Thus, task based requests can be acted upon in an accurate manner, such as, e.g., password changes, funds transfers or other online banking and investing tasks, information requests and searches, among other tasks. As a result, fulfilling the tasks can be performed more efficiently and accurately.

Figure 2:
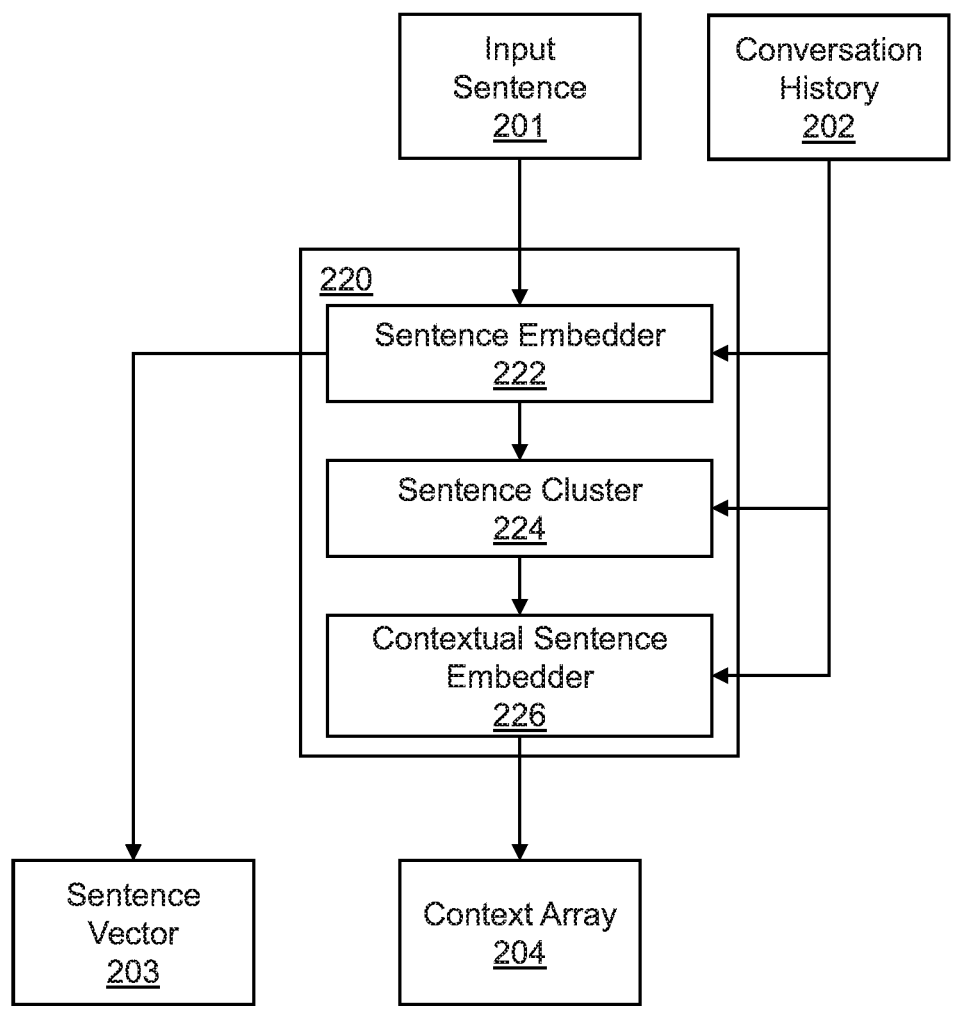
FIG. 2 is a diagram of a context determination unit for automated contextual dialog generation for cognitive conversations, in accordance with an embodiment of the present invention.

Referring now to FIG. 2, a diagram of a context determination unit for automated contextual dialog generation for cognitive conversations is depicted according to an illustrative embodiment of the present invention.

As described above, an input sentence 201 and a conversation history 202 can be provided to a context determination unit 220 to determine context of the input sentence 201 in view of the conversation history 202. The context determination unit 220 uses the input sentence 210 and the conversation history 202 to generate an sentence vector 203 that represents the input sentence 201, and a context array 204 that represents the context of the input sentence 201 in the conversation history 202. The context can include, e.g., one or more relationships between the input sentence 201 and at least one previous sentence in the conversation history 202.

To determine the context, the input sentence 201 is embedded into a feature vector to produce the sentence vector 203. A sentence embedder 222 receives the input sentence 201 and maps the words to a feature space. The sentence embedder 222 can include, e.g., a encoder, or other model for embedding each word into a vector, such as, e.g., word2vec, GloVe, FastText, ELMo, or other word embedding, paragraph embedding, and sentence embedding models including topic models, skip thought models, weight sum of word functions, among others. The sentence embedder 222 can include, e.g., a software or hardware module that is stored in a memory and executed by a processing device, such as, e.g., the processor 110 described above, or a processing device local to the context determination unit 220 or the sentence embedder 222 itself. Thus, the words of the input sentence 201 can be mapped to quantifiable vector to form the sentence vector 203 using identifications (IDs). Each ID can correspond to an idea in a sentence based on, e.g., word, location in the sentence, and other linguistic features.

The sentence embedder 222 can also embed each sentence of the conversation history 202 into feature space to generate sentence vectors for each sentence in the conversation. Thus, the sentence vector 203 as well as the sentence vectors associated with the conversation history 202 can be provided to a sentence cluster 224. The sentence vector 203 can also be stored in a memory or storage, separate from the sentence cluster 224 by, for example, copying the sentence vector 203 to provide an instance of the sentence vector 203 to the sentence cluster 224 and a second instance to storage or a memory.

The embedding of the sentences of the conversation history 202 can be performed on natural language sentences stored in a memory corresponding to a record or log of the conversation during a chat session between the user and the cognitive conversation system, such as, e.g., in the storage device 112 of the cognitive conversation system 100 described above. Accordingly, the cognitive conversation system can also add the input sentence 201 to the log or record of the conversation history 202 to maintain an updated conversation history 202. Alternatively, however, the conversation history 202 can be stored as already embedded sentences in sentence vector form. As a result, the sentence vector 203 can be added to the log of the conversation history 202 rather than the input sentence 201 itself. Thus, an up-to-date record of the conversation can be maintained concurrently with determining a context aware response. Thus, subsequent input sentences can be responded to with up-to-date context.

The sentence cluster 224 captures similarities between sentences in the conversation history 202 by grouping sentence vectors with similar ideas according to the IDs. The sentence cluster 224 can include, e.g., a software or hardware module that is stored in a memory and executed by a processing device, such as, e.g., the processor 110 described above, or a processing device local to the context determination unit 220 or the sentence cluster 224 itself. Moreover, the sentence cluster 224 can be any model for clustering vectors based on similarity. For example, the sentence cluster 224 can include a model for clustering including, e.g., K-means clustering or other centroid based clustering model, hierarchical clustering, distribution clustering models, density based clustering models such as, e.g., DBSCAN or OPTICS, HCS clustering, or neural network based models such as, e.g., self-organizing maps, or any other suitable clustering model.

Accordingly, sentence vectors can be clustered according to similarity. The similarity between sentence vectors represents a corresponding similarity between ideas of the respective sentences. Thus, sentences that include similar ideas will have similar sentence vectors, and thus be clustered together.

Upon clustering sentence vectors, the conversation history 224 can be transformed into an array representing the contextual sentences with a contextual sentence embedder 226. The contextual sentence embedder 226 embeds context based on the clustering of the sentences. For example, the contextual embedder 226 can map a cluster to an ID and embed the sentences in the cluster within a vector according to deviation from, e.g., a centroid of the cluster where a centroid clustering model is used, such as, e.g., K-means clustering. Thus, the contextual sentence embedder 226 can embed conversation contexts (i.e., previous conversation history) into an array of vectors, such as, e.g., an array of 100-dimensional vectors, to represents context by organizing sentence vectors according to related ideas using the clusters from the sentence cluster 224. The array can be stored in a memory or buffer for later use and analysis.

Figure 3:
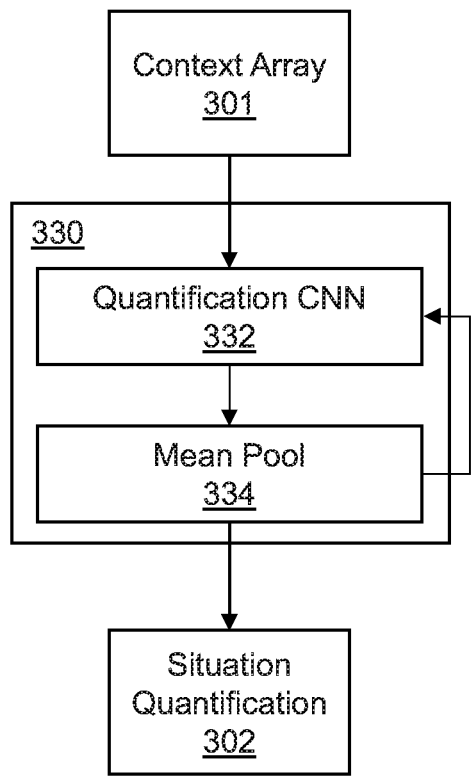
FIG. 3 is a diagram of a situation quantification network for automated contextual dialog generation for cognitive conversations, in accordance with an embodiment of the present invention.

Referring now to FIG. 3, a diagram of a situation quantification network for automated contextual dialog generation for cognitive conversations is depicted according to an illustrative embodiment of the present invention.

According to aspects of the present invention, a context array 301 can be analyzed with a situation quantification network 301 to estimate a situation quantification 302 that quantifies the context of a conversation into a vector form. Accordingly, the situation quantification network 330 includes a quantification convolutional neural network (CNN) 332 and mean pool 334 to generate the situation quantification 302 vector. The situation quantification network 301 can include, e.g., a software or hardware module that is stored in a memory and executed by a processing device, such as, e.g., the processor 110 described above, or a processing device local to the situation quantification network 301.

The quantification CNN 332 retrieves the context array 301 from a memory or buffer, and processes the context array 301 with a series of convolutional layers. Each convolutional layer adjusts the context array 301 with a set of learned weights to transform the context array 301 into a respective output vector. For example, the quantification CNN 332 can perform convolutions on each cluster in the context array using shared weights. The convolution of a cluster extracts semantic features from a cluster of sentences to represent the ideas of the sentences in the cluster, thus identifying context rather than literal words.

The resulting vector for each cluster is passed to a mean pool 334 that pools the vectors into a pooled array according to an average value from each cluster to complete a convolutional layer. The mean pool 334 can then return the pooled array to the quantification CNN 332 for a subsequent convolution to further extract semantic features. Any number of layers can be used to extract the context.

Upon performing a final convolutional layer, the mean pool 334 produces a situation quantification 302 that includes the extracted context from the context array 301. As such, the situation quantification 302 includes a vector that represents the semantic features, including the context, of the context array 301. The situation quantification 302 can then be stored in a memory or buffer for later use or analysis. Alternatively, the situation quantification 302 can be communicated directly to a subsequent component.

Figure 4:
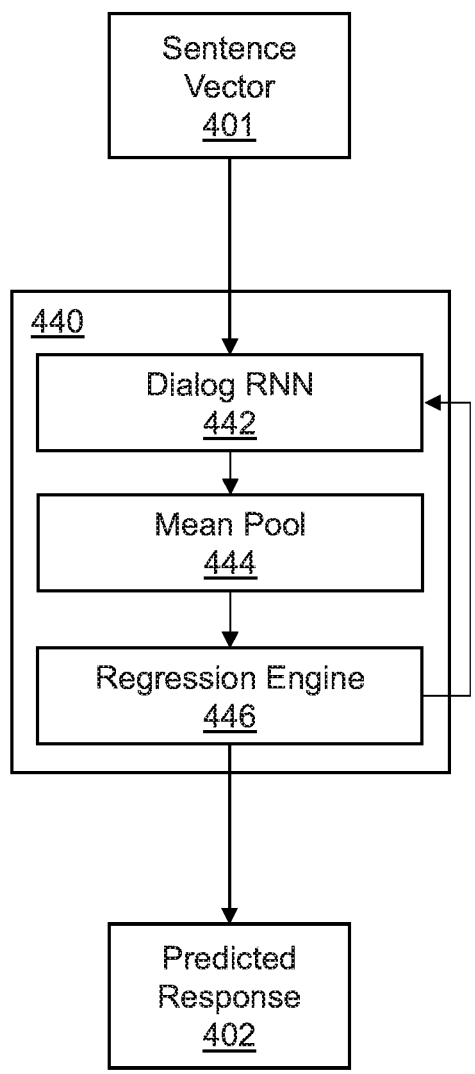
FIG. 4 is a diagram of a dialog prediction network for automated contextual dialog generation for cognitive conversations, in accordance with an embodiment of the present invention.

Referring now to FIG. 4, a diagram of a dialog prediction network for automated contextual dialog generation for cognitive conversations is depicted according to an illustrative embodiment of the present invention.

According to aspects of the present embodiment, a sentence vector 401 can be analyzed by a dialog prediction network 440 to generate a predicted response 402. The dialog prediction network 440 can employ, e.g., seq2seq operations to encode the sentence vector 401 and decode the encoded sentence vector 401 to generate a next word for a response dialog. Therefore, the dialog prediction network 440 can utilize a dialog RNN 442 to perform seq2seq on the sentence vector 401.

The dialog RNN 442 uses a layer of LSTM units to encode the values of the sentence vector 401 corresponding to each word of input sentence into hidden values. The hidden values can be pooled with a mean pool 444 according to the average of the hidden values. As a result, the hidden values are pooled and the mean pool 444 generates a pooled hidden state.

To predict a next word for a response, a regression engine 446 performs a regression on the pooled hidden state. The regression engine 446 can perform regression according to, e.g., a linear regression, ordinary least squares, weighted least squares, non-linear regression or other regression model. To perform the regression, the regression engine 446 can utilize an optimization function according to a regression model, such as those described above, to optimize the pooled hidden state to minimize error. Thus, the regression engine 446 assists in predicting, not just a value, but an optimal value in light of the words already known.

The new value corresponds to a predicted word for a response. This word can be returned to the dialog RNN 442 along with the sentence vector 401 to add the new word to the set of values in the sentence vector 401. The sentence vector 401 with the new word can then be analyzed by the dialog prediction network 440, including application of the model of the dialog RNN 442, the mean pool 444 and the regression engine 446 to predict another new word. This can be done as many times as desired to complete a response prediction to the sentence vector 401. Thus, the dialog prediction network 440 can perform seq2seq analysis to produce a predicted response 402 sequence from the sentence vector 401 sequence.

Figure 5:
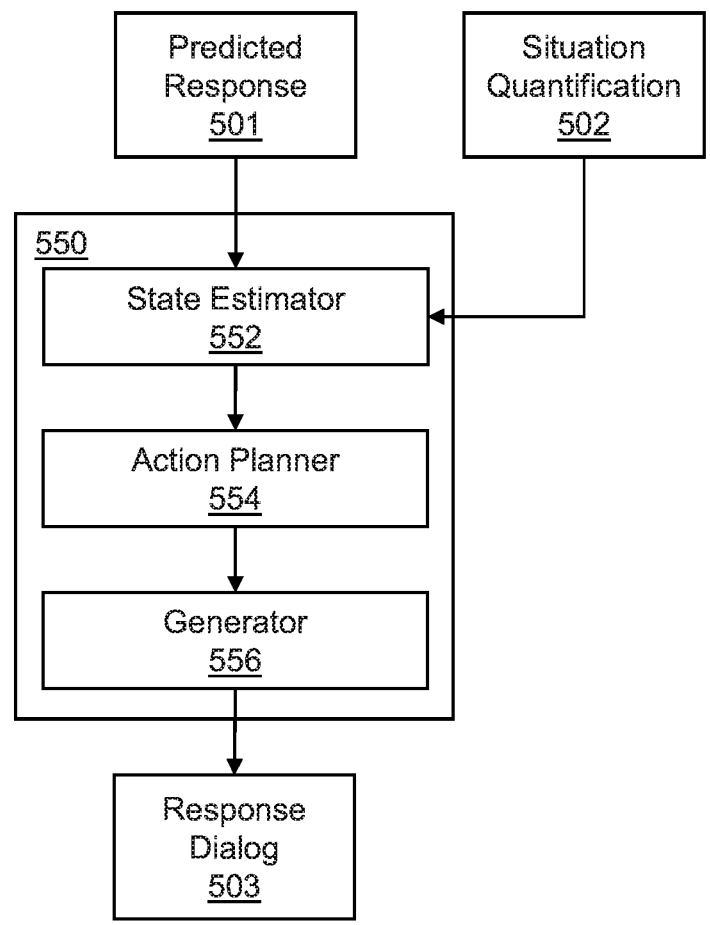
FIG. 5 is a diagram of a response generator for automated contextual dialog generation for cognitive conversations, in accordance with an embodiment of the present invention.

Referring now to FIG. 5, a diagram of a response generator for automated contextual dialog generation for cognitive conversations is depicted according to an illustrative embodiment of the present invention.

According to aspects of the present invention, a predicted response 501 and a situation quantification 502 can be provided to a response generator 550 to generate a response dialog 503. The response generator 550, therefore, can include, e.g., a state estimator 552 to estimate a state of the context of the predicted response 501 using the situation quantification 502, an action planner 554 that analyzes the estimated state to determine a reward of the predicted response 501 with respect to the situation quantification 502, and a generator 556 to optimize the predicted response 501 and generate a natural language response dialog 503.

The state estimator 552 includes an objective to maximize the predicted response 501, including new predicted words resulting from, e.g., seq2seq analysis, and the situation quantification 502 vector. Thus, the state estimator 552 employs a function of the situation quantification 502 and word values of the predicted response 501 according to learned weights. The function represents the dialog state upon generation of the predicted response 501 with respect to the situation quantification 502. The dialog state can be maximized to optimize the predicted response 501 with response to the situation quantification 502, resulting in a dialog state of a conversation.

The state estimation is analyzed by the action planner 554. The action planner 554 can determine a reward of the predicted words compared to given words from an embedded input sentence. The predicted response 501 includes values corresponding to each of the given word values embedded from the input sentence as well as word values predicted by, e.g., a prediction RNN, such as the dialog prediction network described above. The action planner 554 evaluates the value of the dialog state and an action policy according to a reward function. The action policy can be, e.g., a stochastic policy or other set of policies, such that the action planner 554 evaluates the action policies to maximize the value using, e.g., a reinforcement learning model, such as, e.g., a Markov decision process, Monte Carlo method, direct policy search, or other suitable reinforcement learning technique. In doing so, the action planner 554 can determine an action policy that maximizes the reward to predict a next dialog state, including a representation of a response dialog. Moreover, the reward values can be used to update learned weights in, e.g., networks for determining the predicted response 501 and situation quantification 502, such as, e.g., the situation quantification network 130 and 330, and the dialog prediction network 140 and 440 described above.

The next dialog state can be provided to a generator 556 to determine a natural language response dialog 503. The generator 556 can include, e.g., an encoder and decoder, an autoencoder, or a suitable ANN for converting a dialog state to a natural language output. The response dialog 503 can therefore be provided to a user via, e.g., a text based display, an audible output via a speaker, or other user perceptible output.

Figure 6:
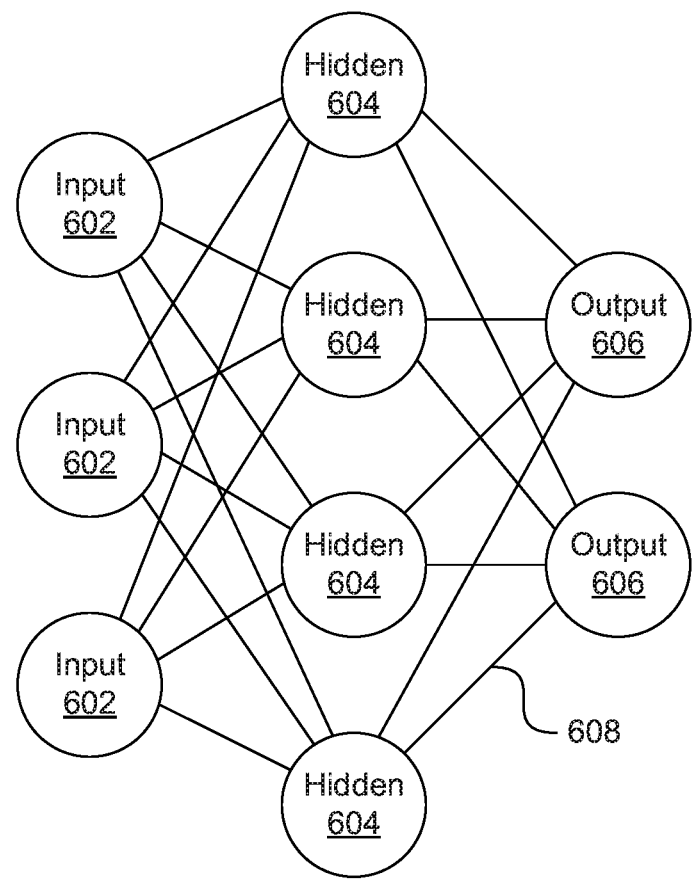
FIG. 6 is a generalized diagram of a neural network, in accordance with an embodiment of the present invention.

Referring now to FIG. 6, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 602 that provide information to one or more "hidden" neurons 604. Connections 608 between the input neurons 602 and hidden neurons 604 are weighted and these weighted inputs are then processed by the hidden neurons 604 according to some function in the hidden neurons 604, with weighted connections 608 between the layers. There may be any number of layers of hidden neurons 604, and as well as neurons that perform different functions. There exist different neural network structures as well, such as convolutional neural network, maxout network, etc. Finally, a set of output neurons 106 accepts and processes weighted input from the last set of hidden neurons 604.

This represents a "feed-forward" computation, where information propagates from input neurons 602 to the output neurons 606. Upon completion of a feed-forward computation, the output is compared to a desired output available from training data. The error relative to the training data is then processed in "feed-back" computation, where the hidden neurons 604 and input neurons 602 receive information regarding the error propagating backward from the output neurons 606. Once the backward error propagation has been completed, weight updates are performed, with the weighted connections 608 being updated to account for the received error. This represents just one variety of ANN.

Figure 7:
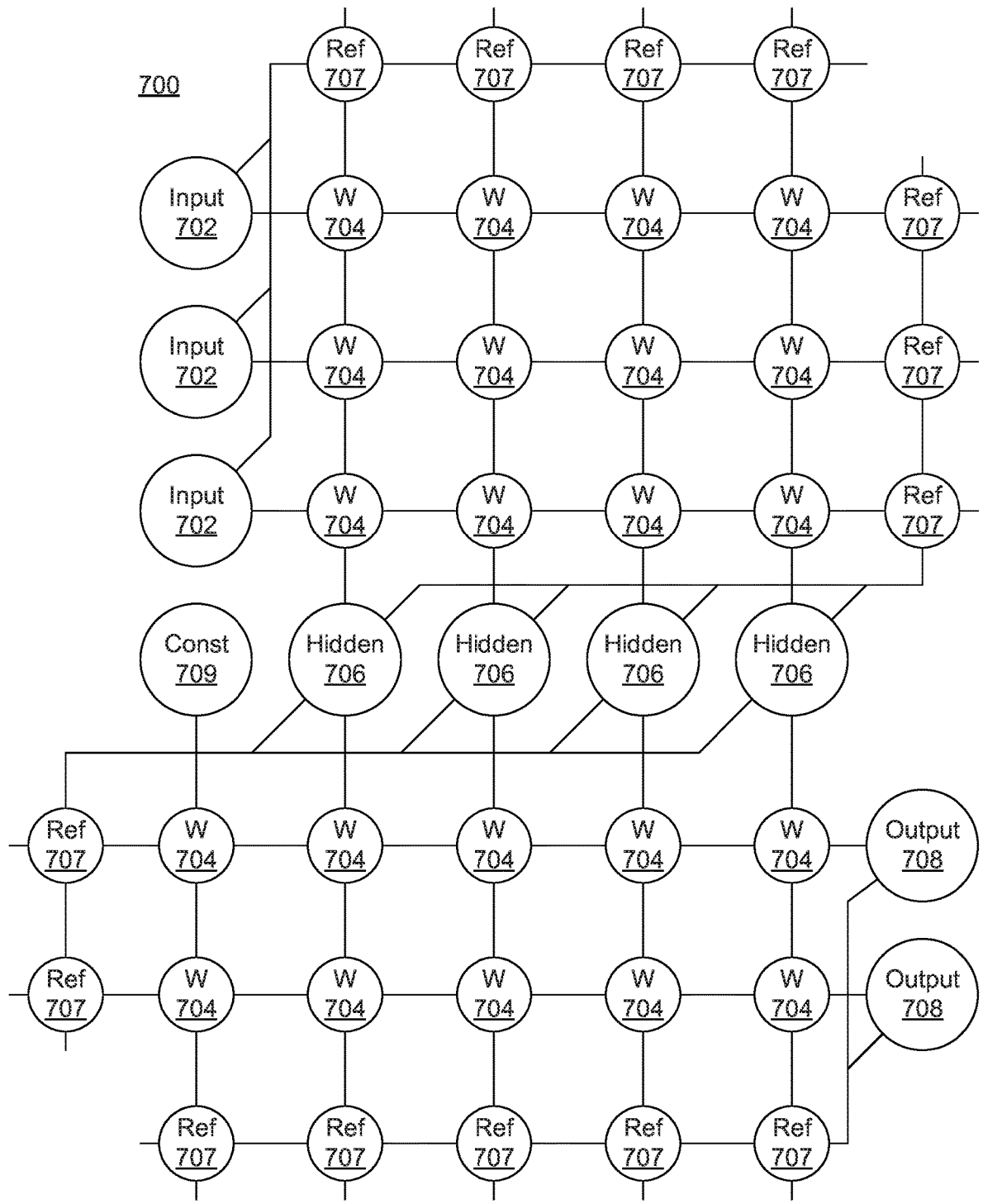
FIG. 7 is a diagram of an artificial neural network (ANN) architecture, in accordance with an embodiment of the present invention.

Referring now to FIG. 7, an artificial neural network (ANN) architecture 700 is shown. It should be understood that the present architecture is purely exemplary and that other architectures or types of neural network may be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 702 each provide an input voltage in parallel to a respective row of weights 704. In the hardware embodiment described herein, the weights 704 each have a settable resistance value, such that a current output flows from the weight 704 to a respective hidden neuron 706 to represent the weighted input. In software embodiments, the weights 704 may simply be represented as coefficient values that are multiplied against the relevant neuron outputs.

Following the hardware embodiment, the current output by a given weight 704 is determined as $1=V/r$, where V is the input voltage from the input neuron 702 and r is the set resistance of the weight 704. The current from each weight adds column-wise and flows to a hidden neuron 706. A set of reference weights 707 have a fixed resistance and combine their outputs into a reference current that is provided to each of the hidden neurons 706. Because conductance values can only be positive numbers, some reference conductance is needed to encode both positive and negative values in the matrix. The currents produced by the weights 704 are continuously valued and positive, and therefore the reference weights 707 are used to provide a reference current, above which currents are considered to have positive values and below which currents are considered to have negative values. The use of reference weights 707 is not needed in software embodiments, where the values of outputs and weights can be precisely and directly obtained. As an alternative to using the reference weights 707, another embodiment may use separate arrays of weights 704 to capture negative values.

The hidden neurons 706 use the currents from the array of weights 704 and the reference weights 707 to perform some calculation. The hidden neurons 706 then output a voltage of their own to another array of weights 704. This array performs in the same way, with a column of weights 704 receiving a voltage from their respective hidden neuron 706 to produce a weighted current output that adds row-wise and is provided to the output neuron 708.

It should be understood that any number of these stages may be implemented, by interposing additional layers of arrays and hidden neurons 706. It should also be noted that some neurons may be constant neurons 709, which provide a constant output to the array. The constant neurons 709 can be present among the input neurons 702 and/or hidden neurons 706 and are only used during feed-forward operation.

During back propagation, the output neurons 708 provide a voltage back across the array of weights 704. The output layer compares the generated network response to training data and computes an error. The error is applied to the array as a voltage pulse, where the height and/or duration of the pulse is modulated proportional to the error value. In this example, a row of weights 704 receives a voltage from a respective output neuron 708 in parallel and converts that voltage into a current which adds column-wise to provide an input to hidden neurons 706. The hidden neurons 706 combine the weighted feedback signal with a derivative of its feed-forward calculation and stores an error value before outputting a feedback signal voltage to its respective column of weights 704. This back propagation travels through the entire network 700 until all hidden neurons 706 and the input neurons 702 have stored an error value.

During weight updates, the input neurons 702 and hidden neurons 706 apply a first weight update voltage forward and the output neurons 708 and hidden neurons 706 apply a second weight update voltage backward through the network 700. The combinations of these voltages create a state change within each weight 704, causing the weight 704 to take on a new resistance value. In this manner the weights 704 can be trained to adapt the neural network 700 to errors in its processing. It should be noted that the three modes of operation, feed forward, back propagation, and weight update, do not overlap with one another.

As noted above, the weights 704 can be implemented in software or in hardware, for example using relatively complicated weighting circuitry or using resistive cross point devices. Such resistive devices may have switching characteristics that have a non-linearity that can be used for processing data. The weights 704 may belong to a class of device called a resistive processing unit (RPU), because their non-linear characteristics are used to perform calculations in the neural network 700. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

Figure 8:
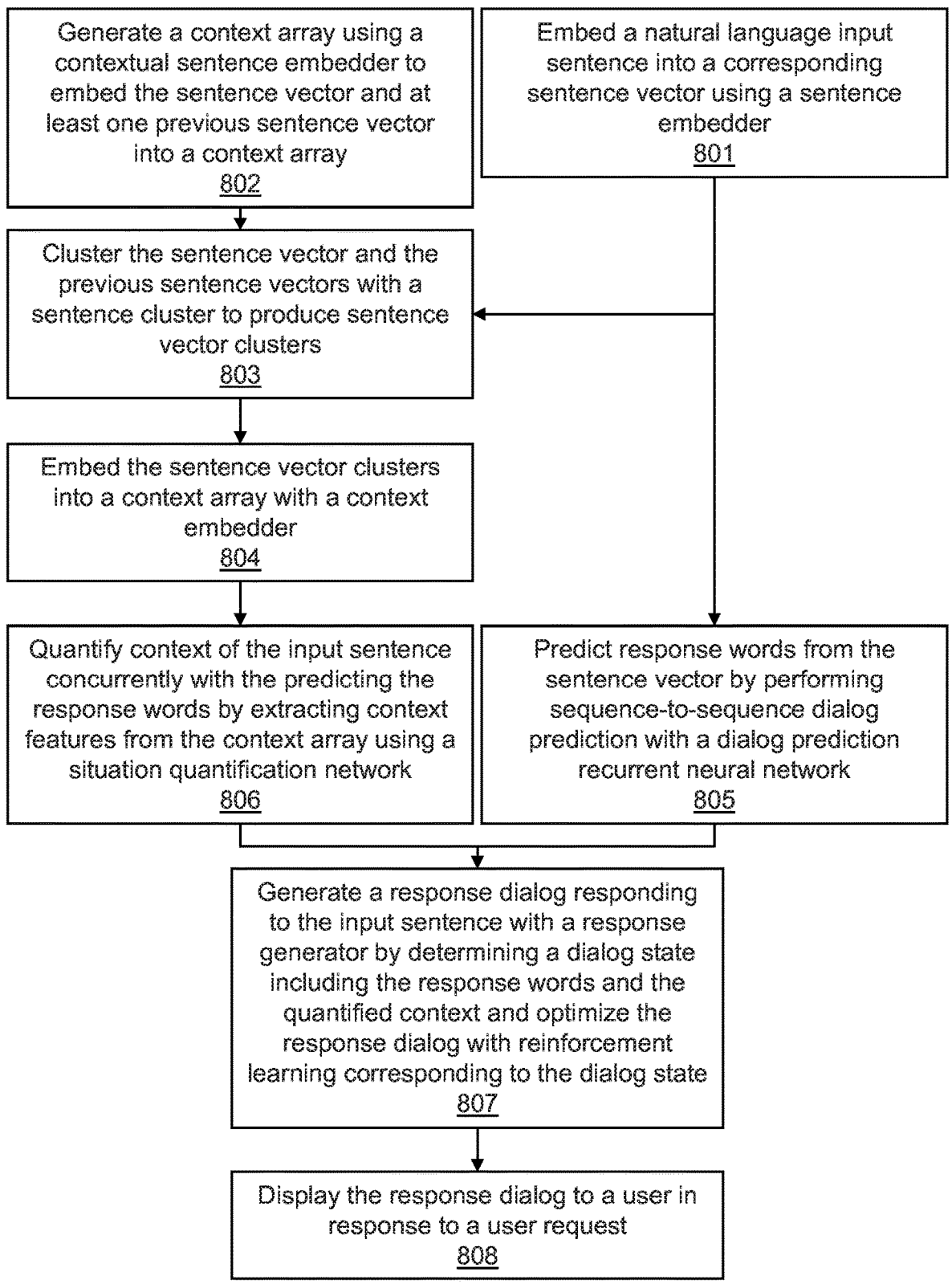
FIG. 8 is a block/flow diagram showing a system/method for automated contextual dialog generation for cognitive conversations, in accordance with an embodiment of the present invention.

Referring now to FIG. 8, a block/flow diagram showing a system/method for automated contextual dialog generation for cognitive conversations is depicted according to an illustrative embodiment of the present invention.

At block 801, a natural language sentence input by a user is embedded into a corresponding sentence vector using a sentence embedder.

At block 802, A context array is generated using a contextual sentence embedder to embed the sentence vector and at least one previous sentence vector into a context array in a memory, each of the at least one previous sentence vector corresponding to a previous sentence in a conversation history stored in a memory.

At block 803, the sentence vector and the previous sentence vectors are clustered with a sentence cluster to produce sentence vector clusters.

At block 804, the sentence vector clusters are embedded into a context array with a context embedder.

At block 805, response words are predicted from the sentence vector by performing sequence-to-sequence dialog prediction with a dialog prediction recurrent neural network.

At block 806, context of the input sentence is quantified concurrently with the predicting the response words by extracting context features from the context array using a situation quantification network.

At block 807, a response dialog is generated responding to the input sentence with a response generator by determining a dialog state including the response words and the quantified context and optimize the response dialog with reinforcement learning corresponding to the dialog state.

At block 808, the response dialog is displayed to a user in response to a user request.

Figure 9:
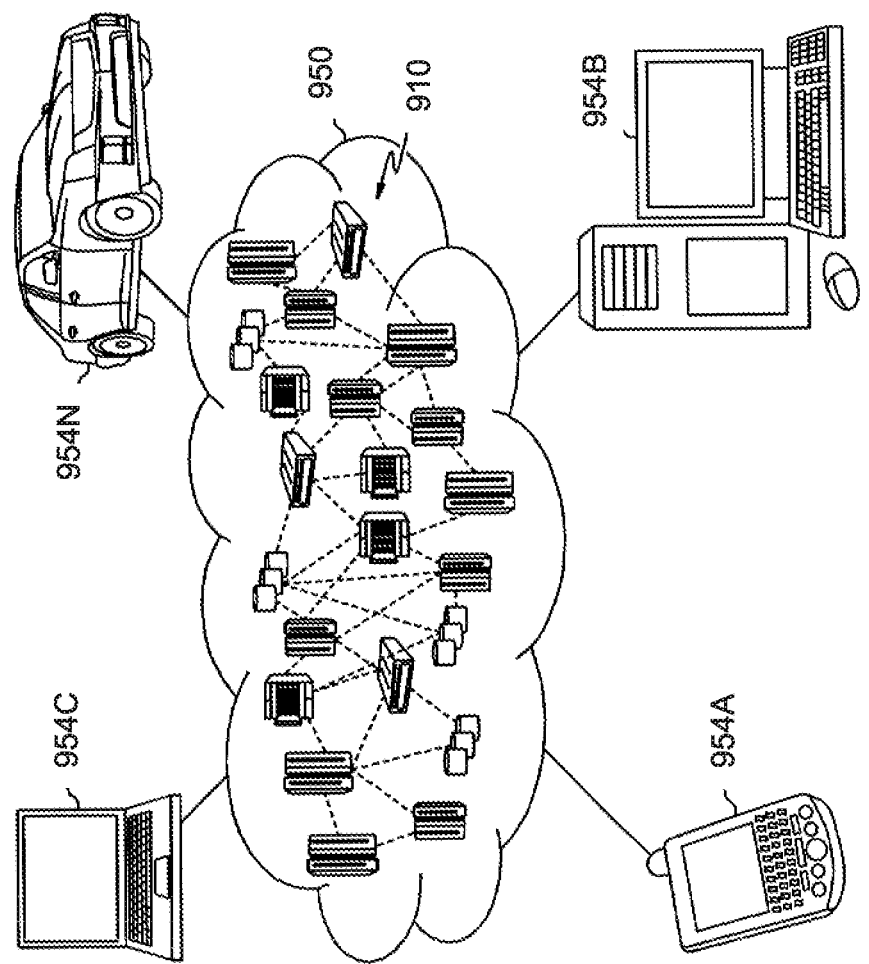
FIG. 9 is a block diagram showing an illustrative cloud computing environment having one or more cloud computing nodes with which local computing devices used by cloud consumers communicate in accordance with one embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 1 are intended to be illustrative only and that computing nodes 910 and cloud computing environment 950 can communicate with any type of computerized device over any type of network and/or network addressable connection (e.g., using a web browser).

Figure 10:
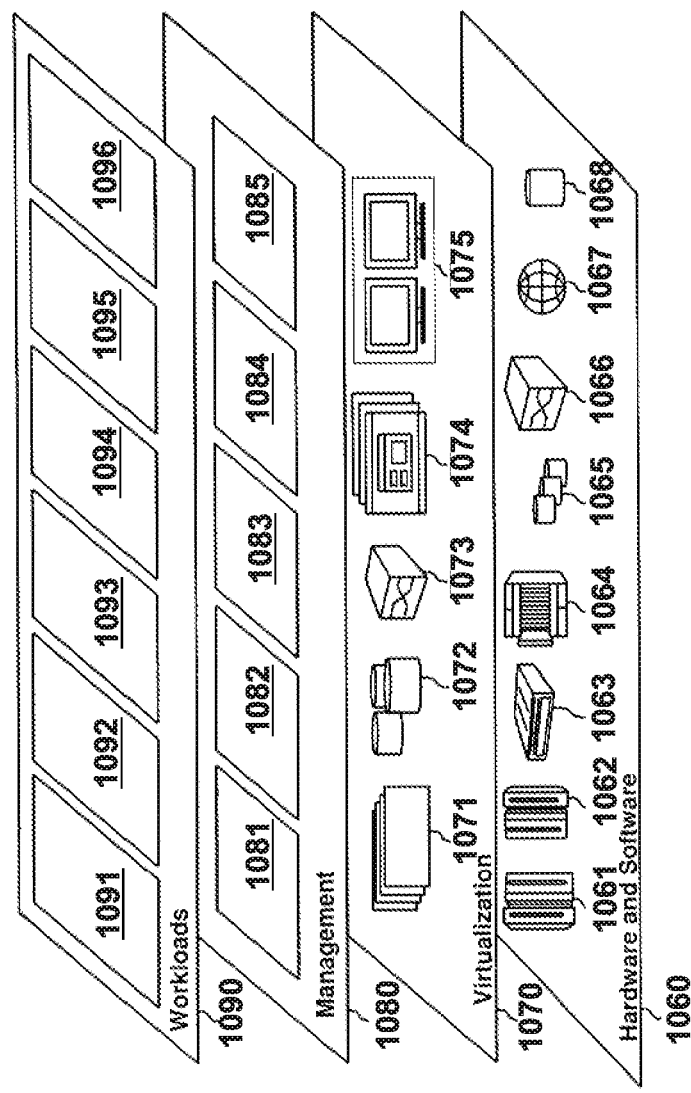
FIG. 10 is a block diagram showing a set of functional abstraction layers provided by a cloud computing environment in accordance with one embodiment

Referring now to FIG. 10, a set of functional abstraction layers provided by cloud computing environment 950 (FIG. 1) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a cognitive conversation system 1096, such as, e.g. the cognitive conversation system 100 described above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for automated contextual dialog generation for cognitive conversations, the method comprising:
    embedding an input sentence in a form of a natural language sentence input by a user to a corresponding sentence vector using a sentence embedder;
    generating a context array using a contextual sentence embedder to embed the corresponding sentence vector and at least one previous sentence vector into the context array in a memory, each of the at least one previous sentence vector corresponding to a previous sentence in a conversation history stored in a memory;
    predicting response words from the corresponding sentence vector by performing sequence-to-sequence dialog prediction with a dialog prediction network;
    quantifying a context of the input sentence by extracting context features from the context array using a situation quantification network; and
    generating a response dialog in natural language to display to a user, the response dialog responding to the input sentence with a response generator by determining a dialog state including the response words and the quantified context and optimizing the response dialog with reinforcement learning corresponding to the dialog state.

2. The method as recited in claim 1, wherein said embedding step includes:
    embedding the input sentence and the previous sentence into corresponding previous sentence vectors; and
    clustering the previous sentence vectors and the corresponding sentence vector according to similarity.

3. The method as recited in claim 2, wherein the clustering includes K-means clustering.

4. The method as recited in claim 1, further including pooling the context features to generate a situation estimation vector.

5. The method as recited in claim 1, wherein performing sequence-to-sequence prediction includes predicting a next word with a recurrent neural network.

6. The method as recited in claim 5, wherein predicting the next word includes analyzing each word of the sentence vector with a long short-term memory unit.

7. The method as recited in claim 5, further including adding the next word to the sentence vector and repeating the sequence-to-sequence prediction with the sentence vector to predict a new next word.

8. The method as recited in claim 1, wherein the context is quantified concurrently with the predicting of the response words.

9. The method as recited in claim 1, wherein quantifying the context includes generation a situation estimation vector by performing convolutions on the context array for each of one or more clusters of sentence vectors in the context array to extract semantic features from each of the one or more clusters.

10. The method as recited in claim 9, further including mean pooling the semantic features of the one or more clusters to produce the situation estimation vector.

11. The method as recited in claim 1, wherein the sequence-to-sequence dialog prediction transforms the corresponding sentence vector into a response vector from which the dialog state is determined.

12. A method for automated contextual dialog generation for cognitive conversations, the method comprising:
    embedding an input sentence in a form of a natural language sentence input by a user to a corresponding sentence vector using a sentence embedder;
    generating a context array using a contextual sentence embedder to embed the corresponding sentence vector and at least one previous sentence vector into the context array in a memory, each of the at least one previous sentence vector corresponding to a previous sentence in a conversation history stored in a memory;
    clustering the corresponding sentence vector and the at least one previous sentence vector with a sentence cluster to produce sentence vector clusters;
    embedding the sentence vector clusters into the context array with a context embedder;
    predicting response words from the corresponding sentence vector by performing sequence-to-sequence dialog prediction with a dialog prediction recurrent neural network;
    quantifying a context of the input sentence concurrently with the predicting the response words by extracting context features from the context array using a situation quantification network;
    generating a response dialog in natural language to display to a user, the response dialog responding to the input sentence with a response generator by determining a dialog state including the response words and the quantified context and optimizing the response dialog with reinforcement learning corresponding to the dialog state; and displaying the response dialog to a user in response to a user request.

13. The method as recited in claim 12, wherein the clustering includes K-means clustering.

14. The method as recited in claim 12, further including pooling the context features to generate a situation estimation vector.

15. The method as recited in claim 12, wherein predicting the next word includes analyzing each word of the sentence vector with a long short-term memory unit.

16. The method as recited in claim 12, further including adding the next word to the sentence vector and repeating the sequence-to-sequence prediction with the sentence vector to predict a new next word.

17. The method as recited in claim 12, wherein quantifying the context includes generation a situation estimation vector by performing convolutions on the context array for each of one or more clusters of sentence vectors in the context array to extract semantic features from each of the one or more clusters.

18. The method as recited in claim 17, further including mean pooling the semantic features of the one or more clusters to produce the situation estimation vector.

19. A system for automated contextual dialog generation for cognitive conversations, the system comprising:

a storage device for storing a conversation history including at least one previous sentence of a conversation; and a processing system that responds to a user input using a processing device, the processing system including:

a sentence embedder that embeds an input sentence in a form of a natural language sentence input by a user to a corresponding sentence vector;

a context embedder that generates a context array by embedding the corresponding sentence vector and at least one previous sentence vector into the context array in a memory, each of the at least one previous sentence vector corresponding to the at least one previous sentence in a conversation history stored in the memory;

a dialog prediction network that predicts response words from the corresponding sentence vector by performing sequence-to-sequence dialog prediction with a dialog prediction network;

a situation quantification network that quantifies a context of the input sentence by extracting context features from the context array; and a response generator that generates a response dialog responding to the input sentence by determining a dialog state including the response words and the quantified context and optimize the response dialog with reinforcement learning corresponding to the dialog state.

20. The system as recited in claim 19, further including a sentence cluster that clusters previous sentence vectors corresponding to each of the at least one previous sentence and the sentence vector according to similarity.

* * * * *